United States Patent [19]
Hoss

[11] Patent Number: 4,747,495
[45] Date of Patent: May 31, 1988

[54] ENGINE STORAGE AND TRANSPORTATION RACK

[75] Inventor: Donald A. Hoss, Southfield, Mich.

[73] Assignee: Chrysler Motors Corporation, Highland Park, Mich.

[21] Appl. No.: 4,938

[22] Filed: Jan. 20, 1987

[51] Int. Cl.⁴ ............................................. A47F 7/00
[52] U.S. Cl. .................................. 211/13; 211/194; 206/319; 410/33; 108/55.3
[58] Field of Search .................. 211/13, 194; 206/319; 410/31, 32, 33, 43; 108/55.1, 55.3

[56] References Cited

U.S. PATENT DOCUMENTS

| | | | |
|---|---|---|---|
| 2,428,893 | 10/1947 | Procissi | 410/31 |
| 4,406,366 | 9/1983 | Forshee | 211/13 X |
| 4,412,615 | 11/1983 | Forshee | 410/31 X |

Primary Examiner—Ramon S. Britts
Assistant Examiner—Blair M. Johnson
Attorney, Agent, or Firm—Edward A. Craig

[57] ABSTRACT

An engine storage and transportation rack is provided for shipping and storage of internal combustion engines. The rack includes a frame upon which is transversely mounted a plurality of pairs of engine support pods. Each pair of pods is designed to accept one engine. The pods include downwardly angled guide surfaces to direct engines being loaded thereon into contact with horizontal support surfaces which accept discrete structure on the underside of the engine for support of the engine on the pod. The remaining portions of the engine are spaced slightly from the pods so as not to be in contact with the pods. However, the pods do restrain longitudinal and transverse movement of the engines.

7 Claims, 4 Drawing Sheets

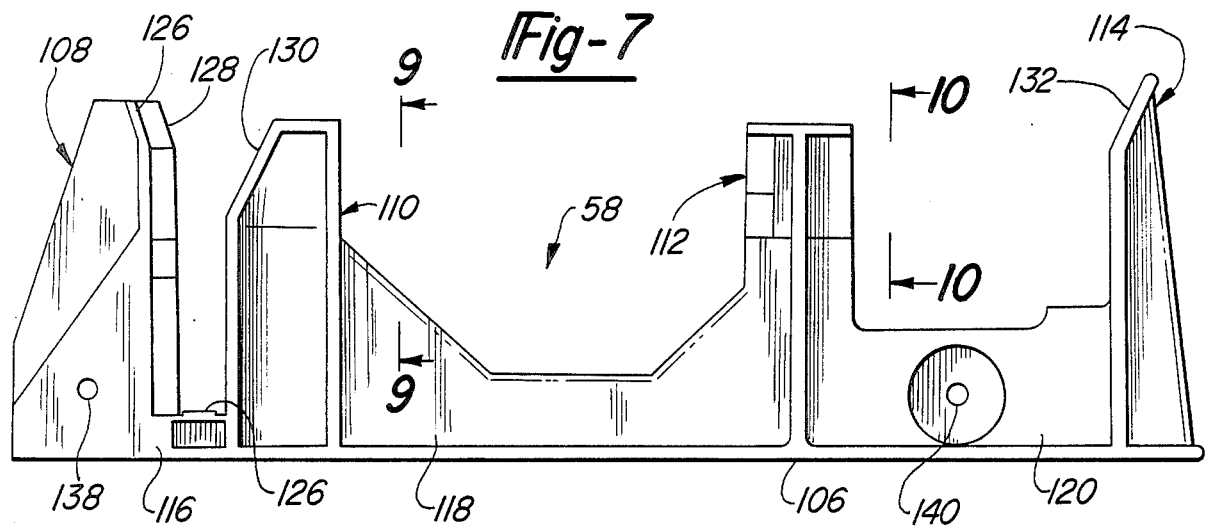
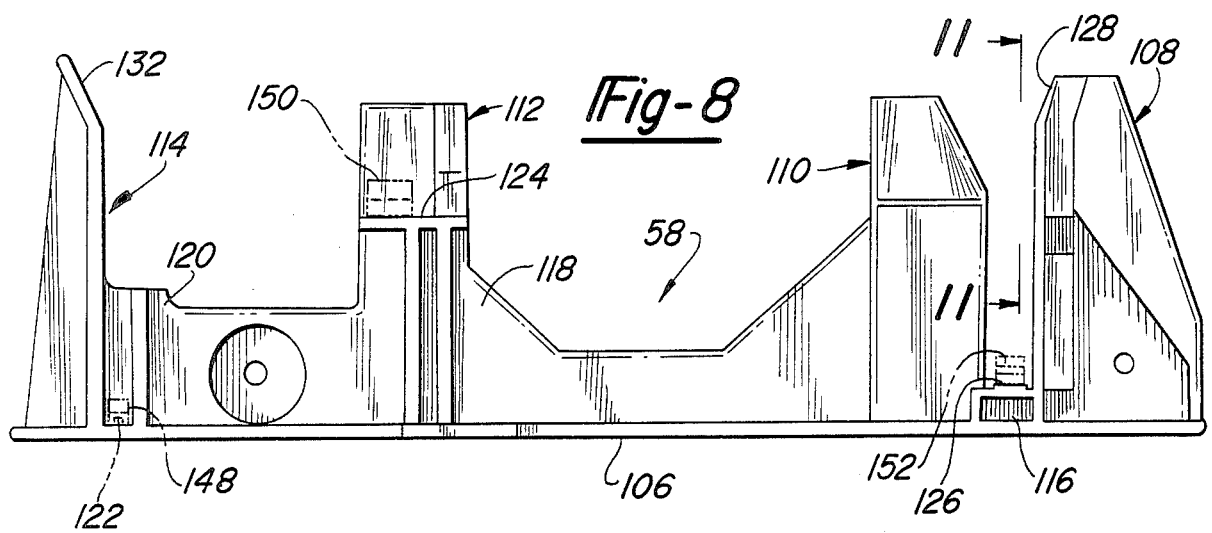
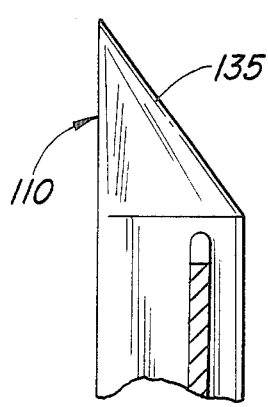
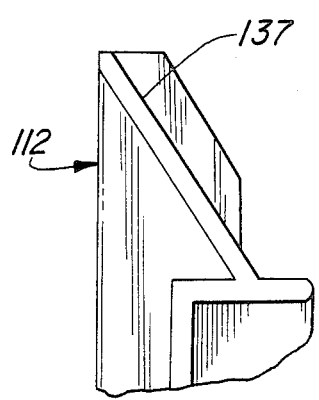
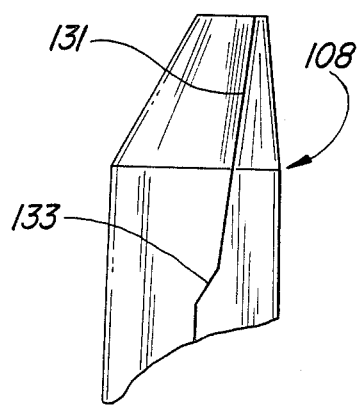

ENGINE STORAGE AND TRANSPORTATION RACK

BACKGROUND OF THE INVENTION

1. Field of the Invention:

This invention relates to an engine storage and transportation rack which includes a support frame upon which is mounted a plurality of pairs of engine support pods, each pair of which supports an engine.

2. Prior Art:

In modern manufacturing, it is common practice to manufacture and assemble completed engines of the internal combustion type for use in motor vehicles at locations remote from the assembly location where the engine is installed into a motor vehicle. One method which has been used in the past to ship engines from the point of manufacture to the point of use has been to enclose the engine in a crate-like container made of wood. Upon reception at the point of use, the container has been stripped from the engine. Subsequently, the wood, which is of an inexpensive variety, has been discarded. Such containers have presented a serious disposal problem at assembly plants. It is quite costly to handle, store and transport empty throw-away containers of this sort.

Another technique for shipping such engines has been to provide metallic racks upon which the engines are stored and transported to a point of use. Such metallic racks have been recycled back to the engine manufacturing location for continuous use.

Engine racks of this type currently available on the market have suffered from the disadvantage of causing, in some cases, damage to the engine. One type of damage has been to the oil pan seal which is provided on the underside of the engine between the engine oil pan and the engine block. Prior racks have permitted the engine weight to be applied to the engine oil pan. This has caused compression of seal gaskets. Upon subsequent installation of such engines in motor vehicles, it has sometimes happened that an imperfect seal is present between the oil pan and the engine resulting in leaks. This is caused by the failure of the sealing material to expand back to its original size after the weight of the engine has been relieved. Other portions of engines have also been subject to damage as a consequence of use of available prior art engine storage and transportation racks.

In accordance with the present invention, pods are provided on an engine storage and transportation rack to receive engines. The pods are so configured as to receive the weight of the engine on a plurality of horizontal surfaces which discrete portions on the underside of the engine rest upon. The remaining engine structure is out of contact with the pods to thereby prevent the weight of the engine being applied thereto. Additionally, the pods are fabricated of an organic plastic material which avoids abrading or scratching of the engine.

SUMMARY OF THE INVENTION

An engine storage and transportation rack is provided which comprises a support frame having a longitudinal and a transverse dimension. A plurality of pairs of crossmembers extend transversely on the frame. The crossmembers of each pair and the pairs of crossmembers are spaced apart longitudinally on the frame. A plurality of pairs of engine support pods are provided on the pairs of crossmembers. Each pair of pods comprises a right-handed engine pod provided on one crossmember of a pair of crossmembers oppositely disposed with respect to a left handed engine pod provided on the other crossmember of the pair of crossmembers. Each pair of pods is adapted to receive and support an engine with the right side of the engine received on the right-hand pod and the left side of the engine received on the left-hand pod. Each pod includes recess means to permit portions of an engine to project longitudinally therebeyond. The space between each pair of pods is unobstructed to permit portions of an engine to project transversely therebeyond.

Each pod includes a plurality of downwardly angled guide surfaces to guide an engine lowered onto a pair of pods in both the longitudinal and transverse directions to a specific support position between a pair of pods. Each pod has a plurality of horizontal surfaces to receive and support discrete structure on the underside of an engine with remaining portions of each pod functioning as non-load bearing but longitudinal and transverse restraining structure.

The pairs of pods are preferably provided in two longitudinal rows on the frame. Each pair of pods is arranged so as to support an engine with the rear of the engine located at a longitudinal edge of the frame and the front of the engine located centrally of the frame. The pods are fabricated of an organic plastic material.

Each pod comprises a base. A plurality of spaced apart upstanding support elements are provided on the base. The spaces between the support elements define the recess means. The downwardly angled guide surfaces are provided on the support elements.

Two of the support elements are closely adjacent. One of the horizontal surfaces is provided on the base between the two closely adjacent support elements. Another of the horizontal surfaces is provided on the support element at a point above the base. This support element is one other than the two closely adjacent support elements. Reinforcing wall structure is provided on the base between adjacent support elements.

BRIEF DESCRIPTION OF THE DRAWINGS

FIG. 7 is an elevational view of the outer face of a right-handed engine support pod;

FIG. 8 is an elevational view of the inner face of the engine support pod of FIG. 7;

FIG. 9 is a view taken along the plane of the line 9—9 of FIG. 7 looking in the direction of the arrows;

FIG. 10 is a view taken along the plane of the line 10—10 of FIG. 7 looking in the direction of the arrows;

FIG. 11 is a view taken along the plane of the line 11—11 of FIG. 8 looking in the direction of the arrows;

DETAILED DESCRIPTION OF A PREFERRED EMBODIMENT

Figure 1:
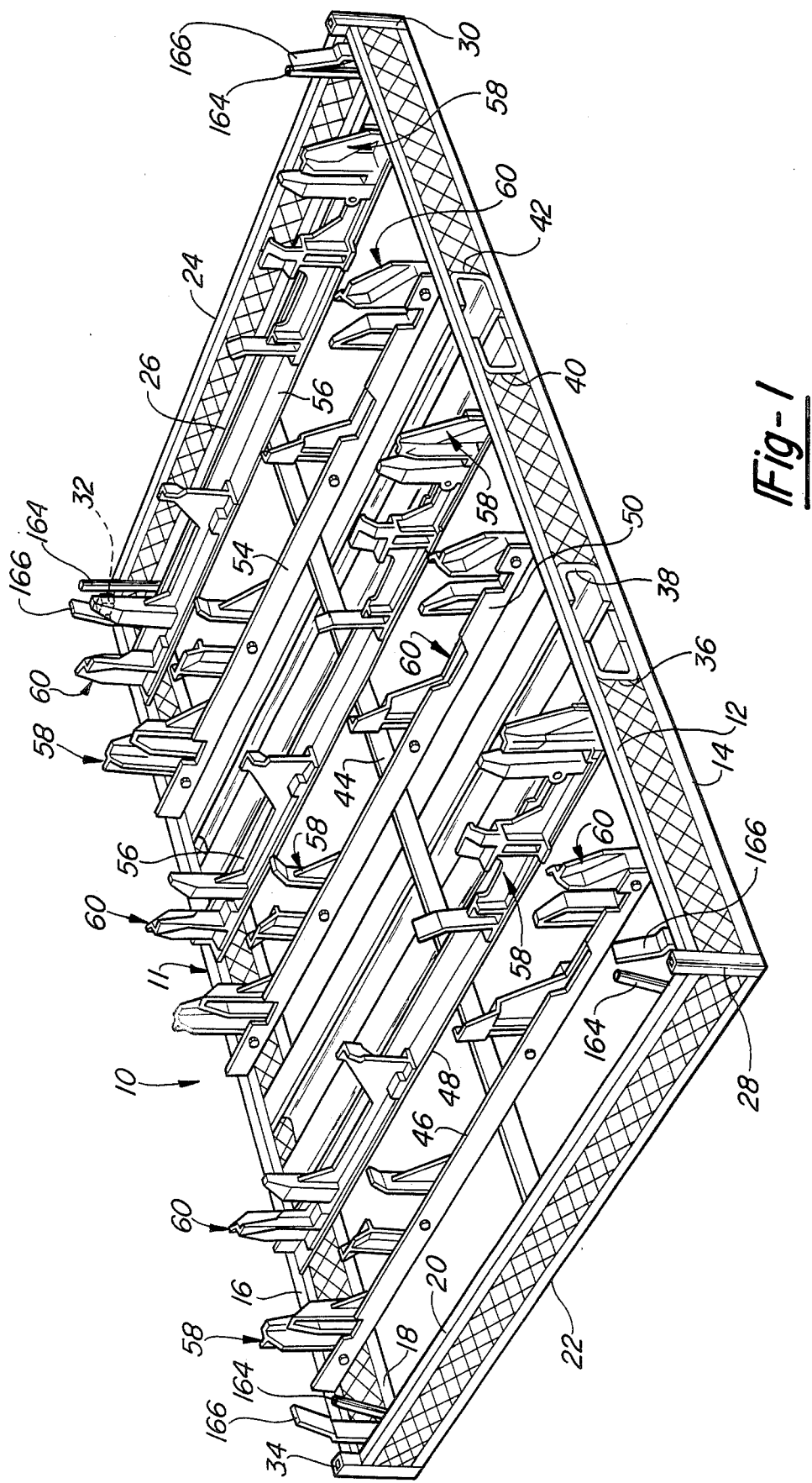
FIG. 1 is a view in perspective of one embodiment of the engine storage and transportation rack in accordance with the present invention.
Figure 12:
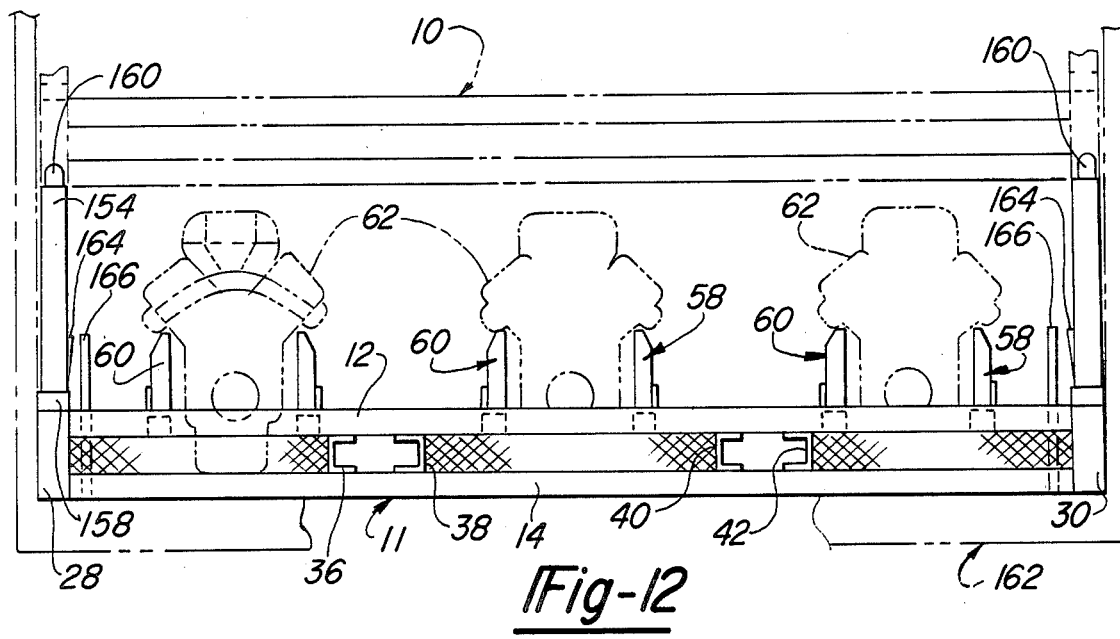
FIG. 12 is an elevational view of the longitudinal side of an engine storage and transportation rack illustratively shown as loaded with engines and placed aboard a transportation trailer with a second engine storage and transportation rack shown stacked thereon.
Figure 13:
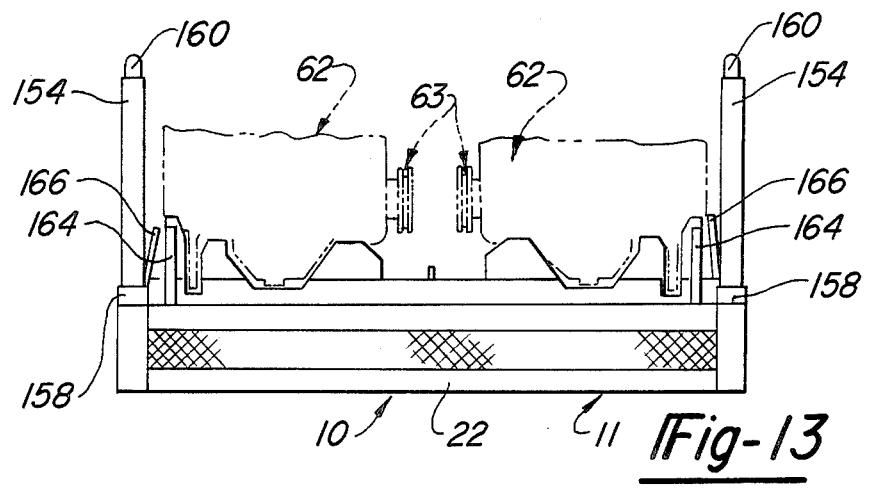
FIG. 13 is an elevational view of the transverse side of the engine storage and transportation rack illustratively shown loaded with engines an with extension support posts placed in sockets in the corners of the rack to permit loading of the second rack thereon.

Referring to FIGS. 1, 12 and 13, it will be noted that the engine storage and transportation rack 10 comprises a support frame 11 which includes upper and lower longitudinal side frame members 12, 14, 16, 18 and upper and lower transverse side frame members 20, 22, 24, 26. These frame members are secured to upstanding corner posts 28, 30, 32, 34 as by welding. The corner posts are tubular members having a square cross section. The side frame members are also tubular elements. As will be noted, the space between the upper and lower frame members is substantially covered by means of an open-work mesh.

Two pairs of U-channels 36, 38, 40, 42 extend transversely of the frame 11. The pairs are spaced apart and function as reinforcing structure. As will be noted, the U-channels extend between the upper and lower longitudinal side frame members 12, 14, 16, 18. The U-channels are welded in place. A longitudinally extending bar support and reinforcing member 44 extends between upper transverse side frame members 20, 24 and is welded thereto. The bar member 44 is positioned centrally of the frame. It rests on the U-channels.

A plurality of pairs of crossmembers, illustratively three in number, extend transversely on the frame 11 and pass over and rest upon the member 44 and are welded to the upper longitudinal side frame members 12, 16. The crossmembers 46, 48, 50, 52, 54, 56 are of L-shape or angle construction. As will be noted, each crossmember of a pair is spaced apart longitudinally on the frame with respect to the other crossmember of the pair and each pair of crossmembers is spaced apart longitudinally from an adjacent pair of crossmembers.

A plurality of pairs of engine support pods, illustratively six in number, are provided on the pairs of crossmembers. Each pair of pods comprises a right-handed engine pod 58 provided on one crossmember of a pair of crossmembers oppositely disposed with respect to a left handed engine pod 60 provided on the other crossmember of the pair of crossmembers. Each pair of pods is adapted to receive and support an engine 62 as illustrated in FIGS. 12 and 13. Conventionally, the rear of an internal combustion engine used in motor vehicles is considered to be the power takeoff point for the vehicle drive train. The front of the engine includes power takeoff means for operating auxiliary equipment and normally includes a plurality of pulleys 63 for belt drive of such items as alternators, power steering pumps and air conditioning compressors. The right-hand side and left-hand side of the engine is determined by a viewer standing at the rear of the engine. Thus, referring to FIG. 12, the engines represented are illustratively shown with the rear facing out of the figure. The left side of the engine is thus the side to the viewer's left while the right side of the engine is the side to the viewer's right. In FIG. 13, the engine pictured to the left has its right side exposed to the viewer while the engine pictured to the right has its left side exposed to the viewer.

The above described right-hand and left-hand and front and back designations have significance in the present invention. The pods 58, 60 are so arranged on the rack 10 as to result in a right-hand pod 58 receiving the right-hand of the engine 62 while the left-hand pod 60 receives the left-hand side of the engine 62. As will be appreciated by viewing FIG. 13, the pods on one longitudinal side of the rack 10 are arranged so that the front of the engine is located centrally of the rack while the rear of the engine is located at a longitudinal edge. In the embodiment illustrated, two longitudinal rows of pairs of pods are provided so that six engines may be mounted on the rack 10. The reason for locating the front of the engine centrally of the rack is so that this portion of the engine, which is most easily damaged, is out of the way of bumps and abrasions or the like. The pulley assemblies 63 are in effect out of harm's way.

The above described front and rear and left-hand and right-hand designations for engines are not necessarily related to the way an engine is mounted in a vehicle. In conventional rear drive vehicles, the front of the engine will actually be at the front of the vehicle and the rear of the engine towards the rear of the vehicle. However, in front wheel drive vehicles where the engine is mounted transversely, the front of the engine will be on one side of the vehicle engine compartment while the rear of the engine will face the other side of the compartment with the left and right-hand the vehicle engine compartment while the rear of the engine will face the other side of the compartment with the left and right-hand sides of the engine facing fore and aft of the vehicle.

The right-handed engine pod 58 and left-handed engine pod 60 have similar structure but do vary somewhat in order to conform to the configuration of the particular engine which the pods are adapted to support. FIGS. 2–6 illustrate the configuration of the left-handed pod 60. As will be therein noted, the pod 60 includes a base 68 having a plurality of spaced apart upstanding support elements 70, 72, 74 provided thereon. The spaces between the support elements 70, 72, 74 define recess means to permit portions of the engine 62 to project longitudinally therebeyond. As will be noted in FIGS. 1 and 12, the space between each pair of pods is unobstructed to permit portions of the engine to project transversely therebeyond. Reinforcing wall structure 76, 78 is provided between the support elements 70, 72, 74. A raised portion is provided on top of the wall structure 78 to define a horizontal surface 82. Another horizontal surface 84 is defined by upstanding structure 86 positioned on the base 68 adjacent to the support element 70. The support element 70 has an inset upper portion which defines a third horizontal surface 90. These three horizontal surfaces function to receive and support discrete structure on the underside of an engine as will be later described.

The pod includes a plurality of downwardly angled guide surfaces to guide an engine lowered onto a pair of pods in both the longitudinal and transverse directions to a specific support position between a pair of pods. As will be noted in FIG. 4, one angled surface 92 on the support element 70 is directed longitudinally towards the oppositely disposed pod 60. A second surface 94 on the support element 72 is also angled towards the opposed pod 60. Surfaces 96 and 98 on support element 74 are angled reversely away from the opposed pod. These surfaces urge an engine to the desired longitudinal position on the rack 10.

Figure 2:
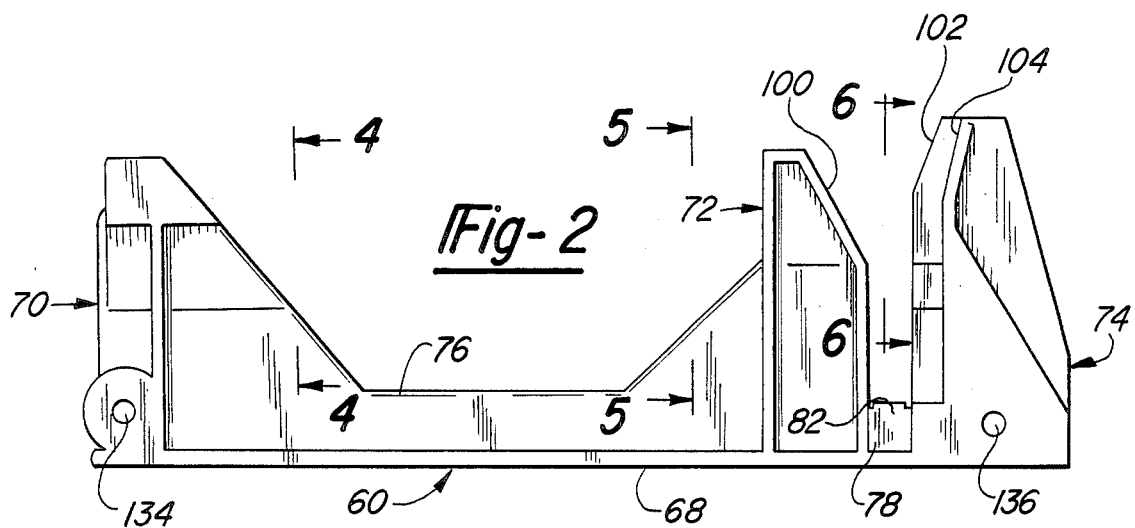
FIG. 2 is an elevational view of the outer surface of a left-handed engine support pod.
Figure 3:
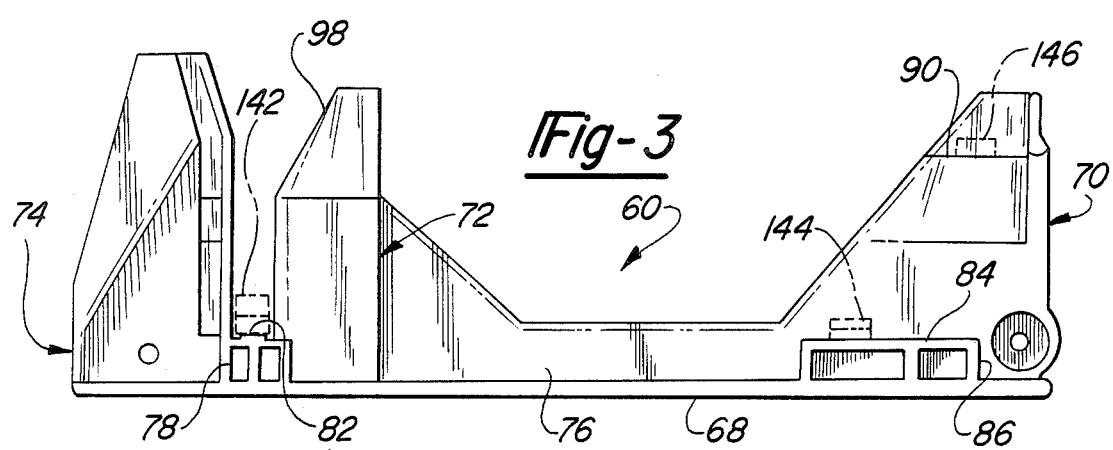
FIG. 3 is an elevational view of the inner surface of the support pod of FIG. 2.
Figure 4:
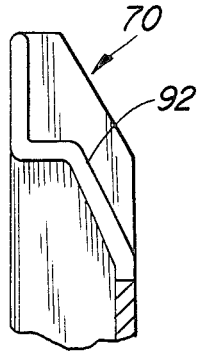
FIG. 4 is a view taken along the plane of line 4—4 of FIG. 2 looking in the direction of the arrows.
Figure 5:
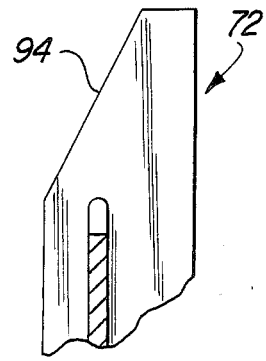
FIG. 5 is a view taken along the plane of the line 5—5 of FIG. 2 looking in the direction of the arrows.
Figure 6:
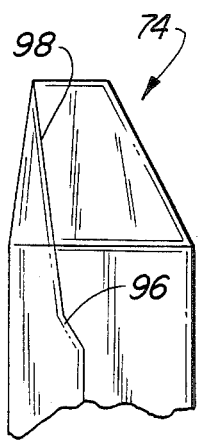
FIG. 6 is a view taken along the plane of line 6—6 of FIG. 2 looking in the direction of the arrows.

The surfaces which guide an engine to the desired transverse position may be seen in FIG. 2. These are surfaces 100 on support element 72, and 102, 104 on support element 74.

The right-hand pod 60 is illustrated in FIGS. 7-11. This pod also includes a base 106 upon which are provided upstanding support elements 108, 110, 112, 114. Wall structures 116, 118, 120 extend between the support elements and function as reinforcing structure. Horizontal support surfaces 122, 124, 126 are provided to receive discrete structure on the underside of an engine.

As shown in FIGS. 7 and 8, downwardly angled surfaces 126, 128, 130, 132 are provided on the support elements 108, 110, and 114 to guide an engine in the transverse direction. As shown in FIGS. 9-11, surfaces 131, 133, 135, 137 on support elements 108, 110, 112 function to guide an engine in the longitudinal direction.

Referring to FIGS. 2 and 7, it will be noted that a pair of openings 134, 136 and 138, 140 are provided in each pod. These openings receive nut and bolt means for securement of the pods to the crossmembers.

The pods are fabricated from an organic plastic material such as a high density polyethlene. This, of course, may be reinforced with a material such as glass fiber matting if desired. The use of a plastic material is advantageous in preventing abrasion of engines. Additionally, plastic material is relatively light weight as compared to steel thus reducing the overall weight and therefore the shipping cost involved in the use of the racks.

Engines are received on the pods 58, 60 with only discrete portions on the underside of the engine resting on the horizontal shelves on the pods. As will be noted in FIG. 3, discrete portions 142, 144, 146 of an engine are supported on the horizontal surfaces 82, 84, 90. Referring to FIG. 8, it will be noted that discrete portions 148, 150, 152 are supported on horizontal surfaces 122, 124, 126. These discrete portions are normally mounting pads used for securing an engine 62 to a motor vehicle. As will be noted in FIGS. 12 and 13, the remaining portions of the engine 62 are spaced from the pods. They do not touch the pods so as to apply a load other than on the horizontal surfaces. However, other portions of the pods do function, particularly as the support elements thereof, as longitudinal and transverse restraining structure. Thus, if the rack 10 is jostled or shaken, there may be transverse or longitudinal shifting of the engines within the pods. Such shifting will be restrained by the remaining pod structure. For example, it will be noted that the support elements 72, 74 of the pod 60 and 108, 110 of the pod 58 are closely adjacent each other on each side of the horizontal support surface 82, 126. This relationship functions as a transverse restraint to engine movement. Similarly, horizontal support surfaces 90, 124 are provided on the support elements 70, 112 with the support elements functioning to restrain longitudinal engine movement. Other pod structure also performs this restraining function.

Figure 14:
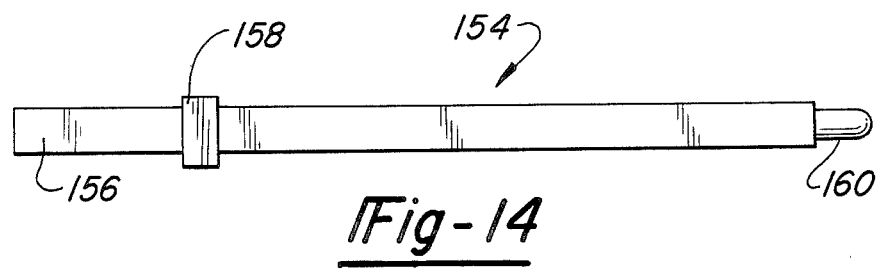
FIG. 14 is a view of a support post.

Referring to FIGS. 12 and 13, it will be noted that the racks 10 may be stacked upon each other for vertical loading. For this purpose, vertical extension members 154, illustrated in FIG. 14 are provided. The members 154 comprise an elongated tubular member having a square cross section of slightly smaller size than the interior dimensions of the corner posts 28, 30, 32, 34. The lower portion 156 is receivable in a corner post which acts as a socket. An enlarged collar 158 is provided as a stop. A bullet-shaped member 160 is provided on the upper end for reception in the lower end of a rack 10 received on top of a lower rack 10 as shown in FIG. 12. The racks 10 are designed to be received longitudinally in a cargo trailer such as "seatrain" 162 of the type used for ocean shipping. The racks 10 may be stacked three high and ten deep in such a trailer. The racks are returnable in a stacked condition. The members 154 are removed and placed within the racks for return purposes. Upwardly extending rod 164 and bar 166 members are provided in each corner of the rack 10 for secure stacking of the racks one upon the other for return purposes.

I claim:

1. An engine storage and transportation rack comprising a support frame having a longitudinal and a transverse dimension, a plurality of pairs of crossmembers extending transversely on the frame, the crossmembers of each pair and the pairs of crossmembers being spaced apart longitudinally on the frame, a plurality of pairs of engine support pods provided on the pairs of crossmembers, each pair of pods comprising a right-handed engine pod provided on one crossmember of a pair of crossmembers oppositely disposed with respect to a left-handed engine pod provided on the other crossmember of the pair of crossmembers, each pair of pods adapted to receive and support an engine with the right side of the engine received on the right-hand pod and the left side of the engine received on the left-hand pod, each pod including recess means to permit portions of an engine to project longitudinally therebeyond, the space between each pair of pods being unobstructed to permit portions of an engine to project transversely therebeyond, each pod including a plurality of downwardly angled guide surfaces to guide an engine lowered onto a pair of pods in both the longitudinal and transverse directions to a specific support position between a pair of pods, each pod having a plurality of horizontal surfaces to receive and support discrete structure on the underside of an engine with the remaining portions of an engine spaced from the pods and other portions of each pod functioning as non-load bearing but longitudinal and transverse restraining structure.

2. An engine storage and transportation rack as defined in claim 1, further characterized in that the pairs of pods are provided in two longitudinal rows on the frame, each pair of pods being arranged so as to support an engine with the front of the engine located at a longitudinal edge of the frame and the rear of the engine located centrally of the frame.

3. An engine storage and transportation rack as defined in claim 1, further characterized in that each pod comprises a base, a plurality of spaced apart upstanding support elements provided on the base, the spaces between the support elements defining said recess means.

4. An engine storage and transportation rack as defined in claim 3, further characterized in that said downwardly angled guide surfaces are provided on the support elements.

5. An engine storage and transportation rack as defined in claim 3, further characterized in that two of the support elements of each pod are closely adjacent, one of said horizontal surfaces being provided on the base between said two closely adjacent support elements.

6. An engine storage and transportation rack as defined in claim 5, further characterized in that one of said horizontal surfaces is provided on a support element of each pod at a point above the base, said last mentioned support element being other than said two closely adjacent support elements.

7. An engine storage and transportation rack as defined in claim 3, further characterized in that reinforcing wall structure is provided on the base between adjacent support elements.

* * * * *